United States Patent Office 3,375,221
Patented Mar. 26, 1968

3,375,221
STABILIZATION OF RUBBER
Henryk A. Cyba, Evanston, Ill., assignor to Universal Oil Products Company, Des Plaines, Ill., a corporation of Delaware
No Drawing. Filed Mar. 10, 1965, Ser. No. 438,771
The portion of the term of the patent subsequent to Apr. 20, 1982, has been disclaimed
3 Claims. (Cl. 260—45.9)

ABSTRACT OF THE DISCLOSURE

Rubber normally subject to oxidative deterioration containing, as an inhibitor against such deterioration, a stabilizing concentration of dicyclohexyldiaminodiphenyl alkane such as, for example, 4,4′-dicyclohexyldiaminodiphenyl methane.

---

This application relates to the stabilization of rubber and more particularly to novel method of preventing oxidative deterioration of rubber.

It is well known that rubber during storage, shipment and use deteriorates due to the action of oxygen. This results in loss of valuable properties including, for example, elastic properties, tensile strength, etc. In accordance with the present invention, such oxidative deterioration is retarded by incorporating in the rubber a novel antioxidant as will be hereinafter described in detail.

The present invention is used for the stabilization of any rubber which normally undergoes oxidative deterioration. The rubber may be of natural or synthetic origin. Synthetic rubbers include diene rubber such as those produced by the reaction of styrene and butadiene (SBR), butadiene and acrylonitrile (Buna N), isoprene and isobutylene (Butyl rubber), etc., as well as reclaims and latices of rubbery materials, whether or not admixed with fillers, pigments, accelerating agents, etc. Natural rubbers include Hevea rubber, caoutchouc, balata, gutta percha, etc. The rubbers hereinbefore set forth are those most commonly in use at the present time. However, it is understood that the use of the novel antioxidant of the present invention is not limited to these particular rubbers but may be used in any rubber which undergoes deterioration upon exposure to oxygen.

It is understood that the rubber differs importantly from other solid condensation or polymeric products. These differences are in the composition, method of manufacture and properties. The rubber composition includes ingredients conventionally incorporated in the rubber to give it the desired properties of elasticity, resiliency, etc. The rubber formulation must be cured in order to impart these desired properties. The particular ingredients and the particular method of manufacture produce the rubber product meeting these requirements.

In one embodiment the present invention relates to a method of stabilizing rubber against oxidative deterioration which comprises incorporating therein a stabilizing concentration of dicyclohexyldiaminodiphenyl methane.

In another specific embodiment the present invention relates to a method of stabilizing rubber against oxidative deterioration which comprises incorporating therein a stabilizing concentration of dicyclohexyldiaminodiphenyl propane.

Any suitable dicyclohexyldiaminodiphenyl alkane is used in accordance with the present invention. Of especial effectiveness, and accordingly particularly preferred, is 4,4′-dicyclohexyldiaminodiphenyl methane. Also of particular effectiveness, and accordingly also preferred, is 4,4′-dicyclohexyldiaminodiphenyl propane. Other dicyclohexyldiaminodiphenyl alkanes of this species include 4,4′-dicyclohexyldiaminodiphenyl ethane, 4,4′-dicyclohexyldiaminodiphenyl butane, 4,4′-dicyclohexyldiaminodiphenyl pentane, 4,4′-dicyclohexyldiaminodiphenyl hexane, etc.

In another embodiment the antioxidant is a 2,4′-dicyclohexyldiaminodiphenyl alkane. Included in this embodiment are 2,4′-dicyclohexyldiaminodiphenyl methane, 2,4′-dicyclohexyldiaminodiphenyl ethane, 2,4′-dicyclohexyldiaminodiphenyl propane, 2,4′-dicyclohexyldiaminodiphenyl butane, 2,4′-dicyclohexyldiaminodiphenyl pentane, 2,4′-dicyclohexyldiaminodiphenyl hexane, etc. In still another embodiment the antioxidant comprises the corresponding 2,2′-dicyclohexyldiaminodiphenyl alkane.

The dicyclohexyldiaminodiphenyl alkane is prepared in any suitable manner. In a preferred method it is prepared by the reductive alkylation of diaminodiphenyl alkane with cyclohexanone. For example, 4,4′-dicyclohexyldiaminodiphenyl methane is prepared by the reductive alkylation of one mole proportion of 4,4′-diaminodiphenyl methane with two mole proportions of cyclohexanone. Similarly, 4,4′-dicyclohexyldiaminodiphenyl propane is prepared by the reductive alkylation of one mole proportion of 4,4′-diaminodiphenyl propane with two mole proportions of cyclohexanone.

The reductive alkylation is effected in any suitable manner. In a preferred embodiment this reaction is effected at an elevated temperature of from about 100–250° C. and a hydrogen pressure of from about 5 to about 200 atmospheres. Any suitable catalyst may be used. One catalyst comprises a mixture of the oxides of chromium, copper and barium. Another catalyst comprises a composite of platinum and alumina. Still other catalysts include those containing nickel, cobalt, palladium, molybdenum, etc.

In another method the antioxidant may be prepared by the reaction of N-cyclohexylaniline with formaldehyde, acetaldehyde, acetone, etc., in the presence of an acidic catalyst, such as hydrochloric acid. As hereinbefore set forth, it is understood that the antioxidant may be prepared in any suitable manner.

The antioxidant of the present invention is incorporated in rubber or rubbery products in any suitable manner and at any suitable stage of preparation. In general, the antioxidant is utilized in a concentration of from about 0.1% to about 5% by weight of the rubber, although lower concentrations down to 0.001% or higher concentrations up to 10% may be used when advantages appear therefor. These concentrations are based on the rubber hydrocarbon exclusive of the other components of the final rubber composition, and are used in this manner in the present specification and claims.

It is understood that the antioxidant of the present invention may be used along with the other additives incorporated in rubber for specific purposes including accelerators, softeners, extenders, wax, reinforcing agents, etc.

As hereinbefore set forth, the antioxidant of the present invention is used in any rubber subject to oxidative deterioration. The antioxidant preferably is incorporated in the rubber composition during milling thereof and prior to vulcanization. In another embodiment the antioxidant may be sprayed or dusted on vulcanized rubber products or the antioxidant is formed as a solution in a suitable solvent and the solution then is sprayed or poured onto vulcanized rubber products, or the vulcanized rubber products are soaked, dipped, suspended or otherwise contacted with the antioxidant.

days. The samples then were evaluated in the conventional manner. The following table reports the more pertinent data of tensile strength, percent elongation at break and moduli.

TABLE II

| Additive | Days of Exposure to Air | Tensile Strength, p.s.i. | Elongation at Break, percent | Modulus 200% (p.s.i.) | 300% (p.s.i.) |
|---|---|---|---|---|---|
| None | 0 | 3,590 | 380 | 1,680 | 2,800 |
| | 1 | 2,255 | 250 | 1,800 | |
| | 2 | 1,710 | 205 | 1,550 | |
| | 4 | 975 | 190 | 830 | |
| | 7 | 735 | 130 | | |
| 1% of 4,4'-dicyclohexyl-diaminodiphenyl propane | 0 | 3,475 | 365 | 1,595 | 2,750 |
| | 1 | 3,455 | 320 | 1,990 | 3,205 |
| | 2 | 3,260 | 300 | 2,065 | 3,260 |
| | 4 | 2,515 | 240 | 2,085 | |
| | 7 | 2,125 | 210 | 2,010 | |
| 2% of 4,4'-dicyclohexyl-diaminodiphenyl propane | 0 | 3,420 | 365 | 1,590 | 2,740 |
| | 1 | 3,560 | 330 | 2,000 | 3,260 |
| | 2 | 3,370 | 310 | 2,045 | 3,285 |
| | 4 | 3,095 | 275 | 2,175 | |
| | 7 | 2,500 | 230 | 2,180 | |

The following examples are introduced to illlustrate further the novelty and utility of the present invention but not with the intention of unduly limiting the same.

*Example I*

The antioxidant of this example is 4,4'-dicyclohexyldiaminodiphenyl propane. It was utilized as an antioxidant in natural rubber of the following recipe:

TABLE I

| Component: | Parts by weight |
|---|---|
| Smoked sheet | 100.0 |
| HAF black | 45.0 |
| Zinc oxide | 3.1 |
| Stearic acid | 3.0 |
| Sulfur | 2.5 |
| Santocure | 0.75 |
| Antioxidant | As indicated |

The rubber was cured for 40 minutes at 140° C.

The rubber was evaluated in the test-tube aging procedure corresponding to ASTM D–52T. In general, this method comprises placing dumbbell specimens of the rubber in a test tube which is immersed in a constant temperature bath. Two long tubes are inserted in the stopper of the test tube, one positioned several inches higher than the other, the latter extending to the bottom of the sample tube. This serves to admit fresh cooler air, while gently replacing the heated air by exhausting the same through the higher tube.

The following table reports results of evaluating a sample of the rubber without antioxidant and samples of the rubber containing one part and two parts per 100 parts of rubber by weight of 4,4'-dicyclohexyldiaminodiphenyl propane. These tests were conducted at 90° C., with sample tubes being removed periodically over a time of 7

From the data in the above table, it will be seen that in the first series of runs, made with the rubber not containing the antioxidant, the tensile strength fell from 3590 to 735 p.s.i., thus showing considerable deterioration during the 7 days exposure to oxygen. Also, the elongation at break fell from 380% to 130% during such time. The 200% modulus fell from 1680 to 830 p.s.i. within 4 days. The figures for 300% modulus after exposure to oxygen could not be obtained because the rubber sample broke.

In contrast to the above, it will be noted that the sample of rubber containing one part by weight of 4,4'-dicyclohexyldiaminodiphenyl propane decreased in tensile strength after 7 days to only 2125 p.s.i., elongation at break to only 210% and that the moduli at both 200% and 300% were considerably improved. In the sample containing two parts by weight of 4,4'-dicyclohexyldiaminodiphenyl propane, the tensile strength after 7 days was 2500 p.s.i., elongation at break was 230% and the moduli also were considerably improved.

*Example II*

The antioxidant of this example is 4,4'-dicyclohexyldiaminodiphenyl methane. It was evaluated in a concentration of 1% by weight and in a concentration of 2% by weight in another rubber preparation similar to that described in Example I. Although the general type of ingredients were the same, the specific HAF black used in this preparation was different from the one used in the preparation described in Example I.

TABLE III

| Additive | Days of Exposure to Air | Tensile Strength, p.s.i. | Elongation at Break, percent | Modulus 200% (p.s.i.) | 300% (p.s.i.) |
|---|---|---|---|---|---|
| None | 0 | 3,470 | 355 | 1,680 | 2,925 |
| | 1 | 2,645 | 305 | 1,450 | 2,620 |
| | 2 | 1,915 | 255 | 1,270 | |
| | 4 | | 240 | 1,045 | |
| | 7 | | 110 | | |
| 1% of 4,4'-dicyclohexyl-diaminodiphenyl methane | 0 | 3,615 | 400 | 1,465 | 2,675 |
| | 1 | 3,470 | 350 | 1,715 | 2,965 |
| | 2 | 3,280 | 325 | 1,815 | 3,110 |
| | 4 | 2,900 | 285 | 1,795 | 2,975 |
| | 7 | 2,115 | 245 | 1,655 | |
| 2% of 4,4'-dicyclohexyl-diaminodiphenyl methane | 0 | 3,750 | 405 | 1,565 | 2,770 |
| | 1 | 3,715 | 370 | 1,720 | 2,995 |
| | 2 | 3,470 | 325 | 1,910 | 3,205 |
| | 4 | 3,000 | 310 | 1,995 | 3,120 |
| | 7 | 2,575 | 265 | 1,935 | |

Here again it will be noted that the antioxidant considerably retarded oxidative deterioration of the rubber.

*Example III*

The antioxidant of this example is 4,4'-dicyclohexyldiaminodiphenyl methane and was used in natural rubber white stock of the following recipe:

TABLE IV

| Component: | Parts by weight |
|---|---|
| Pale crepe | 100 |
| Zinc oxide | 75 |
| Titanium dioxide | 25 |
| Stearic acid | 3 |
| Sulfur | 3 |
| Benzothiazyldisulfide | 1 |
| Antioxidant | As indicated |

The rubber was cured for 40 minutes at 280° C.

The rubber was evaluated in the same manner as described in Example I. The following table reports the results for tensile strength and percent elongation at break of a control sample of the rubber not containing the antioxidant, a sample of the rubber containing one part by weight and another sample of the rubber containing two parts by weight of 4,4'-dicyclohexyldiaminodiphenyl methane.

TABLE V

| Additive | Days of Exposure to Air | Tensile Strength, p.s.i. | Elongation at Break, percent |
|---|---|---|---|
| None | 0 | 2,585 | 590 |
|  | 1 | 2,275 | 525 |
|  | 2 | 1,645 | 460 |
|  | 4 | 875 | 330 |
|  | 7 | 430 | 185 |
| 1% of 4,4'-dicyclohexyl-diaminodiphenyl methane. | 0 | 2,555 | 575 |
|  | 1 | 2,540 | 535 |
|  | 2 | 2,375 | 500 |
|  | 4 | 2,085 | 445 |
|  | 7 | 985 | 275 |
| 2% of 4,4'-dicyclohexyl-diaminodiphenyl methane. | 0 | 2,495 | 575 |
|  | 1 | 2,745 | 535 |
|  | 2 | 2,555 | 485 |
|  | 4 | 2,270 | 460 |
|  | 7 | 1,240 | 330 |

From the data in the above table, it will be seen that oxidative deterioration of the rubber was considerably retarded as evidenced by a comparison of the tensile strengths, after seven days, of 430 p.s.i. for the control sample with 985 p.s.i. and 1240 p.s.i. for the samples of the rubber containing the antioxidant and a comparison of the elongation at break of 185% for the control sample and 275% and 330% for the samples containing the antioxidant.

*Example IV*

The antioxidant of the present invention also was evaluated in a styrene-butadiene rubber. The rubber is of standard recipe and contains the usual ingredients of carbon black, zinc oxide, stearic acid, sulfur, etc. However, the method of testing used in this example is different from the method described in Example I. In general, the method used in this example involves exposing samples of the rubber to infrared at 150° C. and determining carbonyl number. The time required to reach a specified carbonyl number is taken as the Induction Period. Accordingly, the less stable sample of rubber reaches the Induction Period in a shorter period of time. Contrawise, a sample of the rubber which resists deterioration will require a longer period of time to each the Induction Period. This method is described in "Analytical Chemistry," volume 33, page 456, March 1961.

A blank or control sample of the rubber, not containing the antioxidant, reaches the Induction Period within 50 minutes. In contrast, a sample of the same rubber containing 1¼ parts of 4,4'-dicyclohexylidaminodiphenyl methane per 100 parts of rubber by weight did not reach the Induction Period until 1326 minutes. Thus, it is seen that the antioxidant was very effective in retarding deterioration of the rubber.

Another sample of the same rubber containing 1¼ parts of 4,4'-dicyclohexyldiaminodiphenyl propane, when evaluated in the same manner, did not reach the Induction Period until 1015 minutes. Here again, it will be seen that the antioxidant effectively retarded deterioration of the rubber.

For comparative purposes, it may be mentioned that another sample of the same rubber containing a commercial antioxidant marketed under the trade name of "B-L-E," when evaluated in the same manner, had an Induction Period of less than 700 minutes. The "B-L-E" additive is believed to comprise the reaction product of diphenylamine and acetone. It will be noted that the antioxidant of the present invention was more than twice as effective in extending the Induction Period of the rubber when evaluated in the above manner.

I claim as my invention:

1. Natural or synthetic diene rubber normally subject to oxidative deterioration containing, as an inhibitor against said deterioration, a stabilizing concentration of dicyclohexyldiaminodiphenyl lower alkane.

2. Natural or synthetic diene rubber normally subject to oxidative deterioration containing, as an inhibitor against said deterioration, a stabilizing concentration of 4,4'-dicyclohexyldiaminodiphenyl methane.

3. Natural or synthetic diene rubber normally subject to oxidative deterioration containing, as an inhibitor against said deterioration, a stabilizing concentration of 4,4'-dicyclohexyldiaminodiphenyl propane.

References Cited

UNITED STATES PATENTS

| 1,954,377 | 4/1934 | Calcott et al. | 260—45.9 |
| 3,126,412 | 3/1964 | Stahly | 260—45.9 |
| 3,179,620 | 4/1965 | Cyba | 260—45.9 |
| 2,985,617 | 5/1961 | Salyer et al. | 260—45.9 |

DONALD E. CZAJA, *Primary Examiner.*

HOSEA E. TAYLOR, *Examiner.*